United States Patent
Young et al.

(12) 
(10) Patent No.: US 6,173,924 B1
(45) Date of Patent: Jan. 16, 2001

(54) LOW DENSITY FLEXIBLE EDGE TRANSITION

(75) Inventors: Kendall Gardner Young, Coppell; Steven Louis Pauletti, Mesquite, both of TX (US)

(73) Assignee: Northrop Grumman Corporation, Los Angeles, CA (US)

(*) Notice: Under 35 U.S.C. 154(b), the term of this patent shall be extended for 0 days.

(21) Appl. No.: 09/333,219

(22) Filed: Jun. 15, 1999

(51) Int. Cl.[7] ........................................ B64C 3/48
(52) U.S. Cl. ........................ 244/215; 244/219; 244/90 R
(58) Field of Search .................................. 244/213, 214, 244/215, 219, 130, 90 R

(56) References Cited

U.S. PATENT DOCUMENTS

| | | | |
|---|---|---|---|
| 2,305,817 | 12/1942 | Sukohl | 20/91 |
| 2,445,833 | 7/1948 | Kraemer et al. | 244/42 |
| 3,285,540 | 11/1966 | Lee | 244/43 |
| 4,429,844 | * 2/1984 | Brown et al. | 244/219 |
| 4,863,117 | * 9/1989 | Riout | 244/219 |
| 4,865,275 | * 9/1989 | Thompson | 244/219 |
| 4,892,435 | 1/1990 | Anderson | 403/374 |
| 5,088,665 | 2/1992 | Vijgen et al. | 244/200 |
| 5,181,678 | 1/1993 | Widnall et al. | 244/219 |
| 5,222,699 | 6/1993 | Albach et al. | 244/213 |
| 5,288,039 | * 2/1994 | DeLaurier et al. | 244/90 R |
| 5,346,745 | 9/1994 | Bandyopadhyay | 428/156 |
| 5,487,351 | * 1/1996 | Nedderman, Jr. | 244/90 R |
| 5,496,002 | 3/1996 | Schüze | 244/123 |
| 5,794,893 | 8/1998 | Diller et al. | 246/213 |

* cited by examiner

*Primary Examiner*—Galen L. Barefoot
(74) *Attorney, Agent, or Firm*—Terry J. Anderson; Karl J. Hoch, Jr.

(57) ABSTRACT

In accordance with the present invention, there is provided a structural transition system for use between an aerodynamic lifting member and an aerodynamic control device attached thereto. The aerodynamic lifting member has an indenture formed therein which is defined by a first shoulder portion. The control device has a first end and is disposed within the indenture with the first end adjacent the first shoulder portion. The control device is sized and configured to rotate about a control device axis of rotation for deflecting the control device relative to the lifting member. The structural transition system is provided with a torque transfer element disposable between and in mechanical communication with the first shoulder portion and the first end. The torque transfer element is sized and configured to deform in response to deflection of the control device. The structural transition system is further provided with at least two of support elements distributed between the first shoulder portion and the first end. The support elements are in mechanical communication with the torque transfer element. The support elements are sized and configured to incrementally rotate generally about the control device axis of rotation in response to deformation of the torque transfer element.

57 Claims, 3 Drawing Sheets

LOW DENSITY FLEXIBLE EDGE TRANSITION

FIELD OF THE INVENTION

The present invention relates generally to aircraft aerodynamic control surfaces, and more particularly to a structural transition system for use between an aerodynamic lifting member and a rotatable control device attached thereto.

BACKGROUND OF THE INVENTION

Conventional fixed winged aircraft are provided with a variety of aerodynamic control devices which include, for example, flaps, elevators, ailerons, trim tabs, and rudders. These control devices cooperatively operate to increase or decrease lift over a given localized aerodynamic control surface for achieving pitch, yaw and roll control of the aircraft. Such control devices are used in both traditional winged and modern stealthy aircraft designs. These control devices are typically rigid structures which are integrated into the edges of the wings or body (i.e., aerodynamic lifting surfaces) of the aircraft. The control devices are configured to deflect or rotate about an axis of rotation in a hinge-like fashion with respect to the attached aerodynamic lifting surfaces. Typically, such a control device is characterized as having at least one end which is perpendicularly or at least angularly disposed with respect to the axis of rotation. Operation of the control devices typically forms gaps and/or abrupt changes in surface contours at or about the control device ends.

It is contemplated that gaps, abrupt changes, or contour discontinuities occurring between the aerodynamic lifting surface and the attached control device are especially undesirable because they tend to increase aerodynamic drag and lessen the aerodynamic effectiveness of the control surface due to "leakage" at the end portions of the control device.

Prior art attempts to mitigate the formation of such surface discontinuities include U.S. Pat. No. 5,794,893 to Diller et al. and U.S. Pat. No. 5,222,699 to Albach et al. which contemplate use of surface skins which span across the lifting surface/control device gap to smooth the surface transition thereat. These surface skins are formed of an elastomeric material which have rods integrated therein for structural support. It is contemplated that such structural support is required as such surface skin are exposed to various air loads which can undesirably deform the elastomeric surface skins. These reinforcing rods are typically disposed in a spanwise direction and are mounted in large end ribs with either "fixed" or "guided" end conditions. As the control device rotates, these rods are deflected into an "S" shape. In any deflected position, these spanwise rods are required to beam a combination of air load and induced bending load to the end ribs. In the undeflected position, the rods must beam only the air load to the end ribs. Regardless, due to the "fixed" and/or "guided" end conditions, each spanwise rod produced a resultant shear load and bending moment at the end ribs. Due to the plurality of spanwise rods, these shear loads and bending moments must be summed and become the driving design requirement for the end ribs. The resultant rib becomes large and heavy, typically requiring the use of a dense, high strength metallic material, in order to prevent large deflections (vertical and twist) of the end rib and adjacent fixed wing structure.

Such a design results in several complications. First, it is desirable for aircraft structures to be relatively light weight. The weight impact due to the addition of large end ribs tend to lessen the overall performance enhancement provided by the use of the rod reinforced transitions. Second, the hinge moment for driving the control device tends to be severely increased. This results in reduced control device deflection rates, increased actuation size and power requirements, or a combination thereof. Third, such large and heavy end ribs are not typically compatible with advanced military airframe edge designs. Contemporary edge designs call for relatively low density edge members, typically of a composite, thin skinned, honeycomb construction. Heavy metallic ribs are not compatible with this design construction. Finally, the reinforcing rods may tend to suffer from having a limited useful life due to large cyclic defections of the control device.

It is therefore evident that there exists a need in the art for an improved system which mitigates the formation of gaps and abrupt surface contour changes occurring between an aerodynamic lifting surface and an attached control device. In addition, there exists a need for such improved system which mitigates high shear loads and bending moments at the attachment points of the lifting surface and the control device.

SUMMARY OF THE INVENTION

In accordance with the present invention, there is provided a structural transition system for use between an aerodynamic lifting member and an aerodynamic control device attached thereto. The aerodynamic lifting member has an indenture formed therein which is defined by a first shoulder portion. The control device has a first end and is disposed within the indenture with the first end adjacent the first shoulder portion. The control device is sized and configured to rotate about a control device axis of rotation for deflecting the control device relative to the lifting member. The structural transition system is provided with a torque transfer element disposable between and in mechanical communication with the first shoulder portion and the first end. The torque transfer element is sized and configured to deform in response to deflection of the control device. The structural transition system is further provided with at least two of support elements distributed between the first shoulder portion and the first end. The support elements are in mechanical communication with the torque transfer element. The support elements are sized and configured to incrementally rotate generally about the control device axis of rotation in response to deformation of the torque transfer element.

In the preferred embodiment of the present invention, the lifting member and the control device define an aerodynamic surface contour which deforms in response to deflection of the control device. The support elements each have an outer edge which further defines the surface contour. The outer edges are sized and configured to transition the aerodynamic surface contour between the lifting member and the control device adjacent first shoulder portion of the indenture. More particularly, the lifting member may have upper and lower lifting member surfaces and the control device may have upper and lower control device surfaces. The upper and lower lifting member surfaces and the upper and lower control device surfaces define the aerodynamic surface contour. The support elements each may have upper and lower outer edges which further define the surface contour. The upper outer edges are sized and configured to transition the aerodynamic surface contour between the upper lifting member surface and the upper control device surface. Similarly, the lower outer edges are sized and configured to transition the aerodynamic surface contour between the lower lifting member surface and the lower control device surface.

Preferably, the structural transition system is further provided with a flexible outer skin attached to the lifting member and the control device. The outer skin is in mechanical communication with the outer edges of the support elements and deforms in response to rotation of the support elements. The flexible outer skin may be provided with spanwise rods which are integrated therein for assisting in beaming air loads between the outer edges of the support elements. The rods are preferably disposed in slidable engagement with the outer skin so as to allow the outer skin the expand/contract with deflection.

In addition, the structural transition system may be further provided with at least one flexible core section interposed between the support elements. Each core section has upper and lower core surfaces. The upper core surface is aligned with the upper outer edges of the adjacent support elements and the lower core surface is aligned with the lower outer edges of the adjacent support elements. The upper and lower core surfaces are sized and configured to deform in response to rotation of the support elements.

Further, the upper and lower lifting member surfaces taper to a lifting member trailing edge disposed therebetween. The upper and lower control device surfaces taper to a control device trailing edge disposed therebetween. The upper and lower outer edges of each support element taper to a support element tip. The support element tips are distributed between the lifting member trailing edge and the control device trailing edge.

In the preferred embodiment of the present invention, the torque transfer element comprises at least two elongate members and a flexible back plate which is sized and configured to receive the elongate members therein. The support elements and the core sections are attached to the back plate. The elongate members are disposed in slidable communication with the first end of the control device and the first shoulder portion of the lifting member. In this respect, the elongate members move in a twisting motion with respect to each other in response to rotation of the control device. Such twisting motion of the elongate members causes the back plate to deform in a twisting motion which in turn incrementally rotates the attached support elements.

As such, based on the foregoing, the present invention mitigates the inefficiencies and limitations associated with prior art surface transition systems. Advantageously, the chordwise support elements are configured to incrementally rotate so as to facilitate the incremental transition between the ends of the associated control device and the adjacent shoulder portion of the lifting member. The general shape of the flexible outer skin is dictated by the underlying support elements.

By comparison to the prior art reinforcement rod designs, spanwise rods are embedded in upper and lower skins to facilitate surface transition. These rods tend to bend in an "S" shape as the control surface is rotated. The chordwise support elements of the present invention are not bent into shape. As a result, the support elements are sized to carry their respective increment of air load of the transition section. In comparison to prior art reinforcement rod designs, the required actuation power requirements are reduced, because the load bearing structural elements are not require to deform, except for the outer skins and flexible core sections which stretch and twist. In addition, the need for heavy end ribs is mitigated as air loads are beamed forward to the torque transfer element.

It is contemplated that the support elements are particularly adapted to efficiently perform a load bearing function with respect to any air loads imposed thereat. In this respect, the support elements are attached to the torque transfer element in a rib-like cantilever arrangement. These support elements may be formed of a relatively thin rigid material and distributed along between the control device and the lifting member. Such a geometry distributes the air loads to the various support elements and therefore to the attached torque transfer element. It is contemplated that such distribution results in an overall low density solution to the problem of transitioning between the ends of a control device and the adjacent portion of a lifting member. For added structural support, however, flexible core sections may be interposed between the support elements. These core sections may be formed of relatively low density material such as foam.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
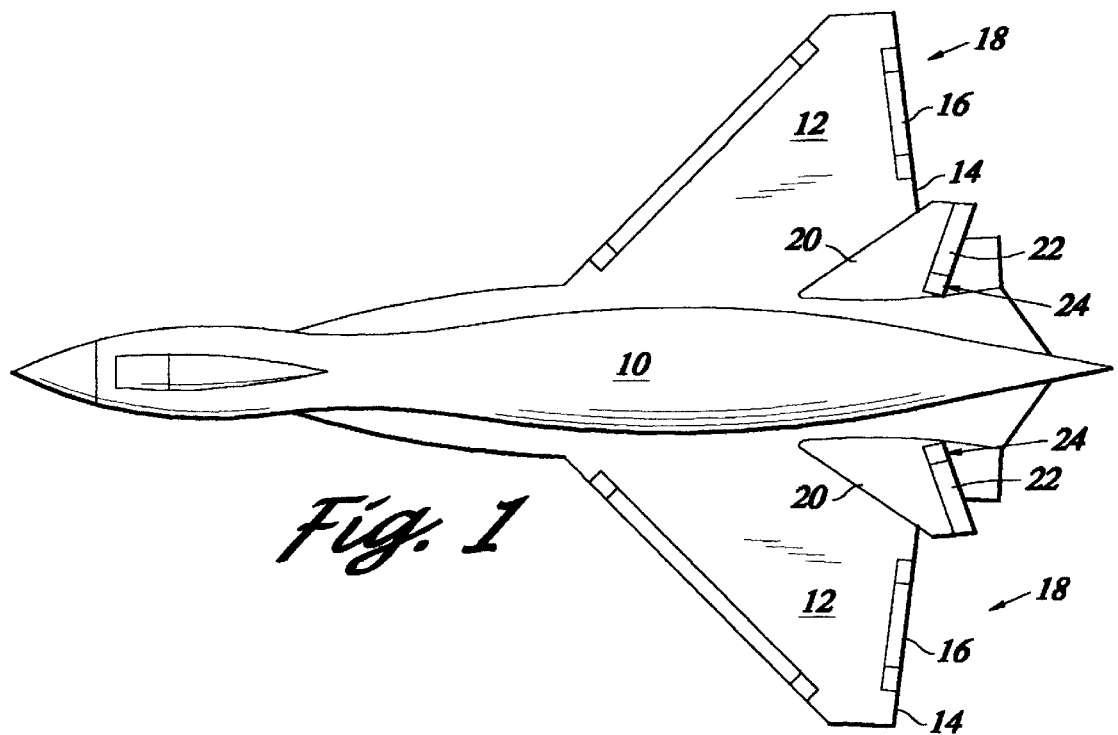
FIG. 1 is a top view of an embodiment of the transition system of the present invention as integrated in an aircraft.
Figure 3:
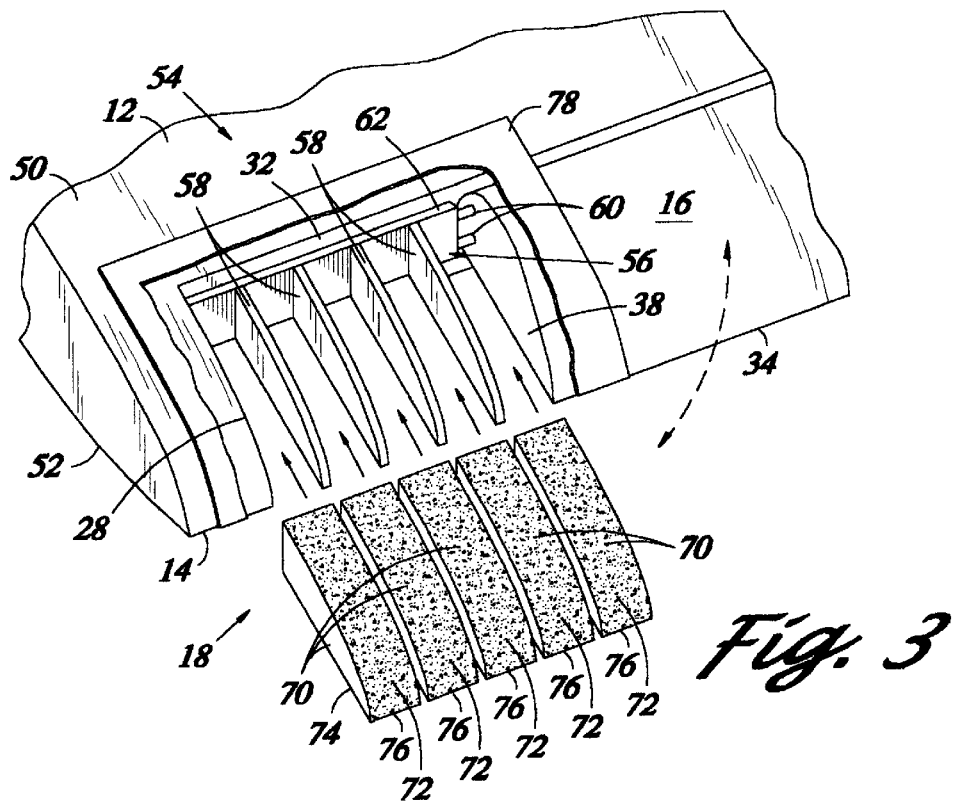
FIG. 3 is an enlarged exploded perspective view of the transition system of the present invention.

Referring now to the drawings wherein the showings are for purposes of illustrating a preferred embodiment of the present invention only, and not for purposes of limiting the same, FIGS. 1–7 illustrate a structural transition system which is constructed in accordance with the present invention. As will be described in more detail below, the transition system facilitates a structural transition between an aerodynamic lifting member and an aerodynamic control device.

Referring now to FIG. 1, there is depicted a representative aircraft 10 having opposing wings 12. The wings 12 have wing trailing edges 14. The wings 12 each have an aerodynamic control device in the form of flaps 16 which are integrally disposed therewithin at the wing trailing edges 14. In one embodiment of the present invention, a structural transition system 18 is configured for integrated use between the wings 12 and the rotatably attached flaps 16. The exemplary aircraft 10 is further provided with a pair of vertical tails 20 each having an aerodynamic control device in the form of a rudder 22. In another embodiment of the present invention, a structural transition system 24 is configured for integrated use between the vertical tails 20 and the rotatably attached control devices 22.

It is contemplated that the present invention may be generally practiced in conjunction with any number of aerodynamic lifting members, such as those symbolically depicted in FIG. 1 as wings 12 and vertical tails 20, and attached control devices, such as flaps 16 and rudders 22. For purposes of only describing the present invention and not limiting the same, however, FIGS. 2–6 symbolically depict an embodiment of the present invention as integrated with an aerodynamic lifting member in the form of the wing 12 and control device in the form of a the flap 16. In this regard, the wing 12 and flap 16 are shown to be oriented in a generally horizontal arrangement. It is specifically contemplated that the present invention may be practiced with aerodynamic lifting members and associated control devices which are oriented in other angular orientations and are of various shapes, sizes and configurations.

Figure 2:
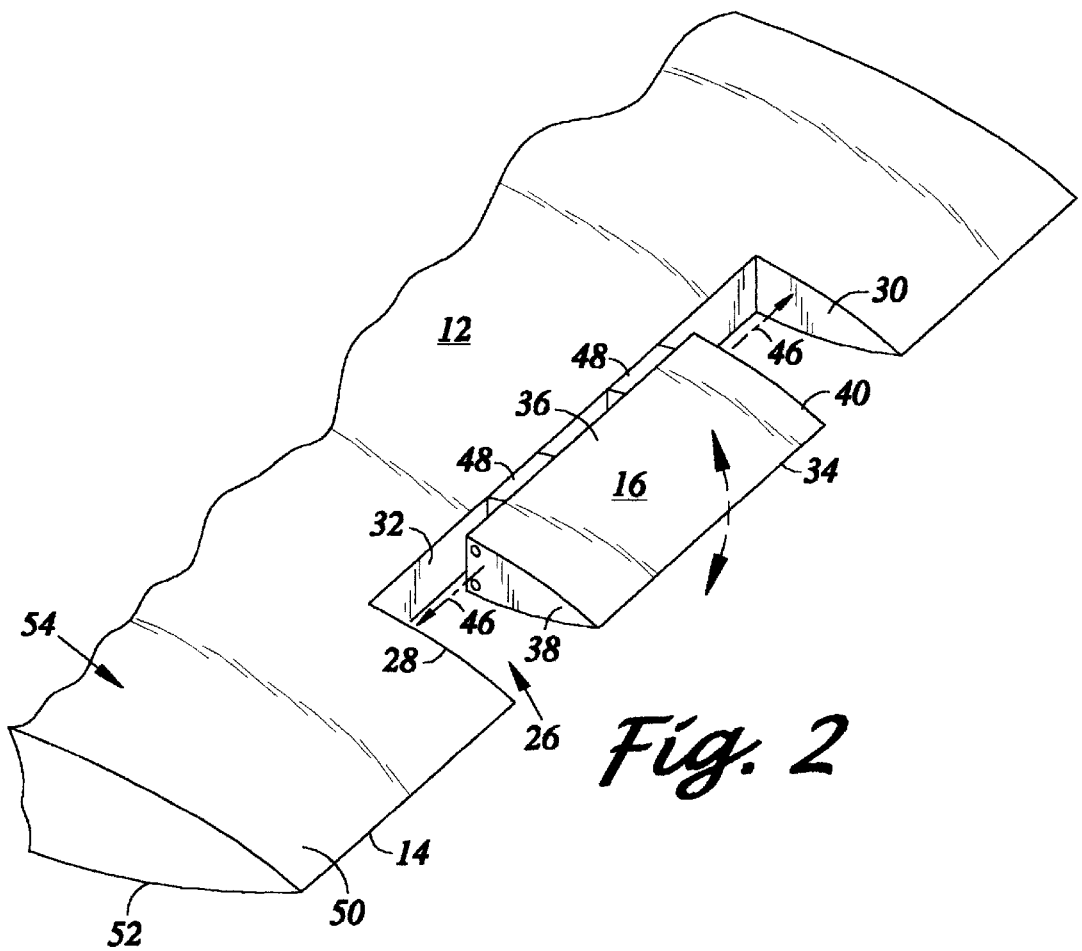
FIG. 2 is an enlarged perspective view of the starboard wing of FIG. 1 shown only with its flap in its operable position.

Referring now to FIG. 2, for ease of explanation, there is depicted an enlarged partial view of the starboard wing 12 and the flap 16 of FIG. 1 as shown without the structural transition system 18 integrated therewith. The wing 12 is provided with a indenture 26 which is sized and configured to integrally receive the flap 16 therein adjacent the wing trailing edge 14. The indenture 26 is defined by first and second shoulder portions 28, 30 and an inboard wall portion 32 interposed therebetween. While the first and second shoulder portions 28, 30 and the inboard wall portion 32 are depicted as being solid surfaces, it is contemplated that such portions 28, 30, 32 are merely reference boundaries which define the indenture 26. In this regard, the first and second shoulder portions 28, 30 and the inboard wall portion 32 may be built up in a typical airframe construction, with ribs and a trailing edge spar. While the first and second shoulder portions 28, 30 are depicted as being generally aligned chordwise and the inboard wall portion 32 is depicted as being generally aligned parallel with the wing trailing edge 14, such portions 28, 30, 32 may be configured at other angular orientations. This would allow for a variable sweep angle of the control surface or to provided for alignment with other manufacturing breaks. The first and second shoulder portions 28, 30 will generally intersect sharply with the wing trailing edge 14, as depicted. Should the wing trailing edge 14 be of a more rounded configuration, the indenture 26 may be designed to accommodate a round flap 16.

The flap 16 has a flap trailing edge 34, opposing inboard side 36, and opposing first and second ends 38, 40. The flap trailing edge 34 is configured to be aligned with the wing trailing edge 14 when the flap 16 is in its undeflected position, as shown in FIG. 2. The flap 16 further has upper and lower flap surfaces 42, 44 which taper to the flap trailing edge 34. In order to perform its aerodynamic control device function, the flap 16 is configured to rotate about a flap axis of rotation 46. In this regard, as symbolically depicted, the flap 16 is provided with flap hinges 48 which facilitate rotation of the flap 16 and attach the flap 16 to wing 12. While, flap axis of rotation 46 is depicted as being generally parallel to the wing trailing edge 14, the flap axis of rotation 46 may be configured at other angular orientations. It is contemplated that the apparatus and method for attaching the flap 16 to the wing 12 and for facilitating the rotation and actuation of the flap 16 may be chosen from those which are well known to one of ordinary skill in the art.

The wing 12 is provided with upper and lower wing surfaces 50, 52 which taper to the wing trailing edge 14. The upper and lower wing surfaces 50, 52 generally define an aerodynamic surface contour 54. As one of ordinary skill in the art can appreciate, when the flap 16 is in an undeflected position, as shown in FIG. 2, the upper and lower flap surfaces 42, 44 are configured to generally follow the aerodynamic surface contour 54. In this respect the upper and lower flap surfaces 42, 44 further define the aerodynamic surface contour 54. It is contemplated that when the flap 16 is rotated from its undeflected position, a significant discontinuity is created in the aerodynamic surface contour 54 between the wing 12 and the flap 16. In particular, a discontinuity is formed between the upper wing surface 50 adjacent the first shoulder portion 28 of the indenture 26 and the upper flap surface 42 adjacent the first end 38. A similar discontinuity is formed between the lower wing surface 52 adjacent the second shoulder portion 30 of the indenture 26 and the lower flap surface 44 adjacent the second end 40. Such discontinuities are most observable when comparing the spacial offset of the wing trailing edge 14 to the flap trailing edge 34. The structural transition system 18 of the present invention is particularly adapted to mitigate such discontinuities in the aerodynamic surface contour 54.

Referring now to FIGS. 3–7, for purposes of further describing a preferred embodiment of the present invention, the exemplary structural transition system 18 is more particularly described. Enlarged partial views of the structural transition system 18 are depicted as integrated with the wing 12 adjacent the exposed first end 38 of the flap 16.

Figure 7:
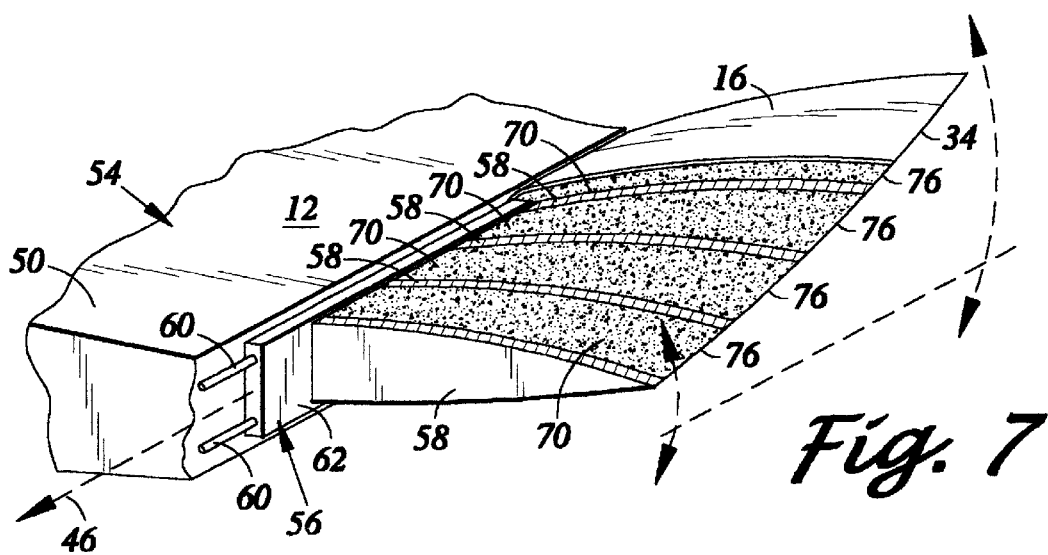
FIG. 7 is a similar perspective view of the transition system as depicted in FIG. 4 with the control device and transition system in a deflected position.
Figure 4:
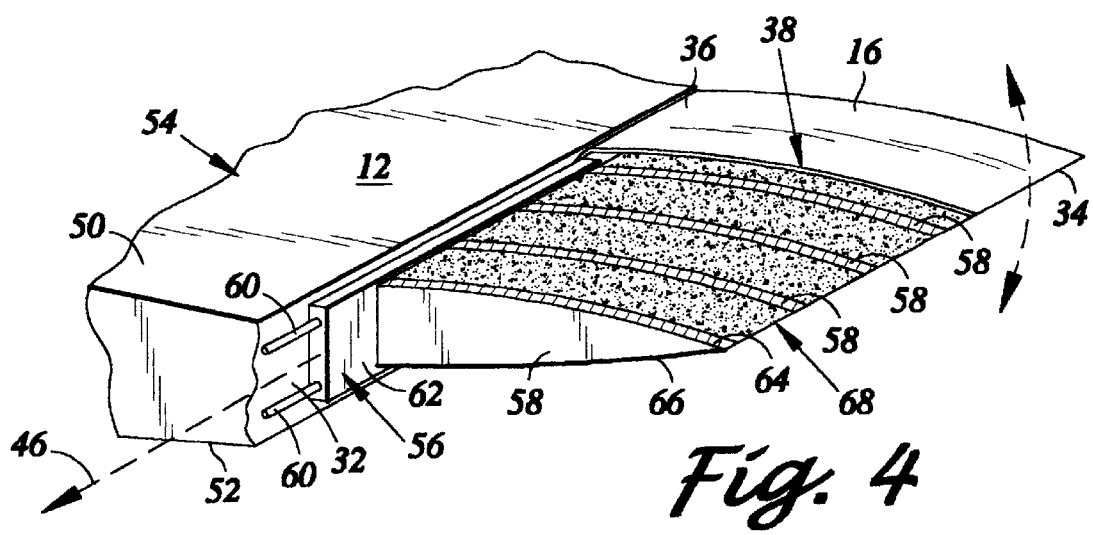
FIG. 4 is an enlarged perspective view of the transition system of the present invention as shown with a control device in an undeflected position.
Figure 5:
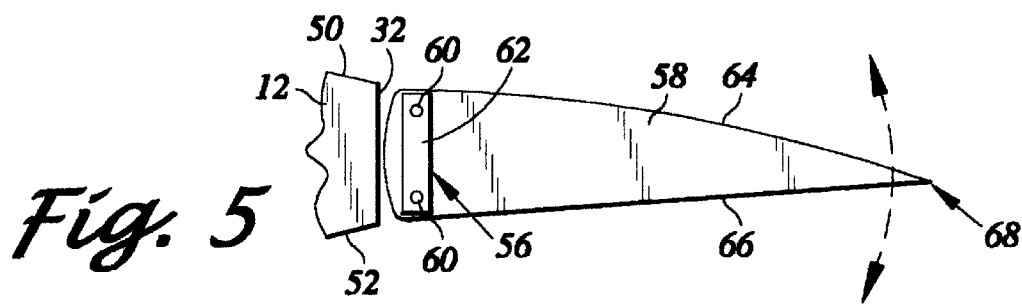
FIG. 5 is a side view of the transition system depicted in FIG. 4.
Figure 6:
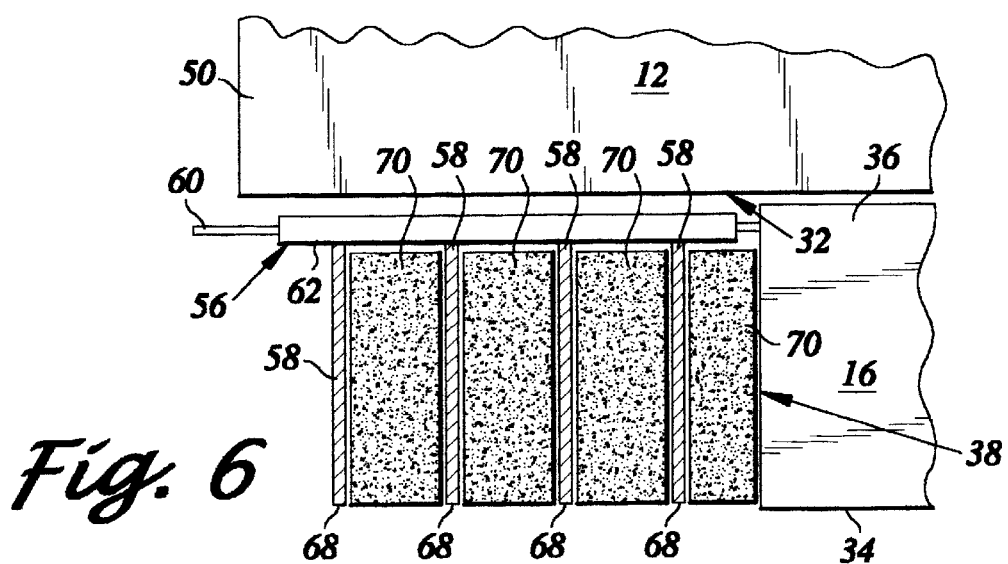
FIG. 6 is a top view of the transition system depicted in FIG. 4.

The structural transition system 18 is provided with a torque transfer element 56 which is disposed between and in mechanical communication with the first shoulder portion 28 of the indenture 26 and the first end 38 of the flap 16. The torque transfer element 56 is sized and configured to deform in response to deflection of the flap 16. The structural transition system 18 is further provided with at least two of support elements 58 distributed between the first shoulder portion 28 and the first end 38. The support elements 58 are in mechanical communication with the torque transfer element 56. The support elements 58 are sized and configured to incrementally rotate generally about the flap axis of rotation 46 in response to deformation of the torque transfer element 56, as depicted in FIG. 7 and discussed in detail below.

In the preferred embodiment of the present invention, the torque transfer element 56 comprises at least two elongate members 60 and a flexible back plate 62 which is sized and configured to receive the elongate members 60 therein. The elongate members 60 may take the form of stiffened rods, however, other shapes and cross-sectional configurations are contemplated. The elongate members 60 are preferably formed of a high strength low weight metal alloy. The particular material selection for the elongate members 60 is chosen from those which are well known to one of ordinary skill in the art. Importantly, upon deflection of the flap 16, the elongate members 60 are configured to twist with respect to one another. In this regard, the elongate members 60 are generally aligned parallel to the flap axis of rotation 46. The elongate members 60 are preferably disposed in slidable communication with the first end 38 and the first shoulder portion 28. Such slidable communication may be facilitated by the use of apparatus and methods which are well known to one of ordinary skill in the art, which may include, for example, bushings and bearings. In this respect, the elongate members move in a twisting motion with respect to each other in response to deflection of the control device. Such twisting motion of the elongate members 60 causes the flexible back plate 62 to deform in a twisting motion and assumes a spiral shape. In order to facilitate a smooth deformation of the back plate 62, the elongate members 60 are disposed in slidable communication with the back plate 62. As such, the back plate 62 may be formed to have bores formed therethrough which are sized and configured to receive the elongate members 60 therein. The particular material selection for the back plate 62 is chosen from those which are well known to one of ordinary skill in the art, which may include, for example, thick durable rubber.

As mentioned above, the structural transition system 18 is provided with at least two of support elements 58 distributed between the first shoulder portion 28 and the first end 38. The support elements 58 are disposed in mechanical communication with the torque transfer element 56. Preferably, the support elements 58 are attached to the back plate 62 and the elongate members 60 pass through the inboard (or forward) ends of the support elements 58. The elements 58 may be bushed to slidably communicate with the elongate members 60. The particular method of attaching the support elements 58 to the back plate 62 may be chosen from those which are well known of one of ordinary skill in the art. The support elements 58 are sized and configured to incrementally rotate generally about the flap axis of rotation 46 in response to deformation of the torque transfer element 56.

In the preferred embodiment of the present invention, the support elements 58 each have upper and lower support element edges 64, 66 which taper to a support element tip 68. As such, the support elements 58 are generally triangular shaped. Advantageously, the upper and lower support element edges 64, 66 are sized and configured to further define the aerodynamic surface contour 54. In this respect, when the flap 16 is in its undeflected position, upper and lower support element edges 64, 66 are sized and configured to conform to the aerodynamic surface contour 54. Upon deflection of the flap 16, as depicted in FIG. 7, the support elements 58 incrementally rotate and the upper and lower support element edges 64, 66 are positioned so as to smoothly transition the aerodynamic surface contour 54 between the first end 38 of the flap 16 and the first shoulder portion 28 of the indenture 26 of the wing 12. In particular, the upper support element edge 64 facilitates a relatively smooth transition of the surface contour 54 between the upper surface 42 of the flap 16 and the upper wing surface 50. Similarly, the lower support element edge 66 facilitates a relatively smooth transition of the surface contour 54 between the lower surface 44 of the flap 16 and the lower wing surface 52.

In addition, when the flap 16 is in its undeflected position, the support element tip 68 is sized and configured to align with the flap trailing edge 34 and the wing trailing edge 14. Upon deflection of the flap 16, support elements 58 incrementally rotate such that the support element tips 68 thereof are positioned so as to smoothly transition between the flap trailing edge 34 and the wing trailing edge 14.

It is contemplated that the support elements 58 may be generally planar and configured to rotate and move predominantly in a plane defined by such planar shape. Moreover, the support elements 58 are configured to support air loads as peripherally imposed about their upper and lower support element edges 64, 66 and transfer such loads within the plane of such support elements 58. In this respect, the support elements 58 are attached to the torque transfer element 56 in a rib-like cantilever arrangement. As such airloads are transferred in the plane of the support elements 58, the support elements 58 may be formed of a relatively thin rigid material, such as light weight fiberglass material. The particular material selection for the support elements 58 is chosen from those which are well known to one of ordinary skill in the art. Further, the support elements 58 need not be formed of a solid plate as depicted, but rather may have a I-beam cross-section, Z-section or other truss-like configuration for reducing the weight thereof. In addition, as the support elements 58 are distributed along the torque transfer element 56, such geometry advantageously distributes the airloads to the various ones of the support elements 58, and therefore to the attached elongate members 60 of the torque transfer element 56. The support elements 58 and elongate members 60 are sized and configured to be of sufficient mechanical strength to facilitate the transfer of the air loads which take the form of both shear and bending loads.

In addition, the structural transition system 18 may be further provided with at least one flexible core section 70 interposed between the support elements 58. Each core section 70 has upper and lower core surfaces 72, 74. The upper core surface 72 is aligned with the upper support element edges 64 of the adjacent support elements 58 and the lower core surface 74 is aligned with the lower support element edges 66 of the adjacent support elements 58. The upper and lower core surfaces 72, 74 are sized and configured to deform in response to rotation of the support elements 58. As such, the upper and lower core surfaces 72, 74 further define the aerodynamic surface contour 54 and facilitate the surface transition thereof. The upper and lower core surfaces 72, 74 are sized and configured to taper to form a core trailing edge 76 therebetween. The core tailing edge 76 is aligned with the support elements tips 68 of the adjacent support elements 58. In addition, it is contemplated that the core sections 70 may further assist in supporting airloads imposed across the adjacent aerodynamic surface contour 54. As such, the core sections 70 are preferably attached to the flexible back plate 62 and the adjacent support members 58 for transferring forces thereto. Advantageously, the core sections 70 tend to maintain the support elements 58 generally in their intended plane, thus restraining them from large yawing deflections. The particular material selection for the core sections 70 is chosen from those which are well known to one of ordinary skill in the art, and may include, for example, low density elastomeric materials such as foam rubber.

Preferably, the structural transition system 18 is further provided with a flexible outer skin 78 attached to the wing 12 and the flap 16 spanning over the indenture 26. The outer skin 78 is in mechanical communication with, preferably bonded to, the upper and lower support element edges 64, 66 of the support elements 58 and the upper and lower core surfaces 72, 74. The shape of the flexible outer skin 78 is dictated by the position of the underlying support elements 58. Thus, the outer skin 78 is sized and configured to deform in response to rotation of the support elements 58, and further defines the aerodynamic surface contour 54. The particular material selection for the outer skin 78 and method of attachment are chosen from those which are well known to one of ordinary skill in the art, and may include, for example, elastomeric materials such as rubber sheeting. Further, the outer skin 78 may include spanwise reinforcement rods which are integrated with the outer skin 78 for supporting airloads thereat.

During operation the outer skin 78 initially encounters air loads impinging thereon. As the outer skin 78 is flexible in nature, such air loads are principally transferred to the underlying support structure. In this regard, as mentioned above, the support elements 58 are configured to support air loads as peripherally imposed about their upper and lower support element edges 64, 66. Thus, the air loads are transferred from the outer skin 78 to the adjacent support elements 58. In turn, the support elements 58 transfer loads to the attached torque transfer element 56 in a rib-like cantilever arrangement. In addition, the core sections 70 are configured to received airloads transferred from the adjacent outer skin 78. As such, the support elements 58 and the core sections 70 which are interposed between adjacent support elements 58 provide an underlying support structure over which the outer skin 78 may conform to for maintaining a relatively smooth transition of the surface contour 54.

Further, it is contemplated that the outer skin 78 may be elastic in nature. As such, upon deflection of the flap 16 and therefore the underlying support elements 58, the outer skin 78 or portions thereof may be disposed in tension. Such internal tension forces within the outer skin 78 may further act to resist any air loads encountered by the outer skin 78.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A structural transition system for use between an aerodynamic lifting member and an aerodynamic control device attached thereto, the aerodynamic lifting member having an indenture formed therein, the indenture being defined by a first shoulder portion, the control device having a first end, the control device being disposed within the indenture with the first end disposed adjacent the first shoulder portion, the control device being sized and configured to rotate about a control device axis of rotation for deflecting the control device relative to the lifting member, the structural transition system comprising:

a torque transfer element, formed of at least two elongate members, disposable between and in mechanical communication with the first shoulder portion of the lifting member and the first end of the control device, the torque transfer element being sized and configured to deform in response to deflection of the control device; and at least two of support elements distributed between the first shoulder portion and the first end, each of the support elements being in mechanical communication with the torque transfer element, the support elements being sized and configured to incrementally rotate generally about the control device axis of rotation in response to deformation of the torque transfer element.

2. The structural transition system of claim 1 wherein the lifting member and the control device define an aerodynamic surface contour which deforms in response to deflection of the control device, the support elements each have an outer edge which further defines the surface contour, the outer edges are sized and configured to transition the aerodynamic surface contour between the lifting member and the control device adjacent first shoulder portion of the indenture.

3. The structural transition system of claim 2 further comprising a flexible outer skin attached to the lifting member and the control device, the outer skin is in mechanical communication with the outer edges of the support elements and deforms in response to rotation of the support elements.

4. The structural transition system of claim 2 wherein the lifting member has upper and lower lifting member surfaces, the control device has upper and lower control device surfaces, the upper and lower lifting member surfaces and the upper and lower control device surfaces define the aerodynamic surface contour, the support elements each has upper and lower outer edges which further define the surface contour, the upper outer edges are sized and configured to transition the aerodynamic surface contour between the upper lifting member surface and the upper control device surface, the lower outer edges are sized and configured to transition the aerodynamic surface contour between the lower lifting member surface and the lower control device surface.

5. The structural transition system of claim 4 further comprising at least one flexible core section interposed between the at least two support elements, the core section has upper and lower core surfaces, the upper core surface is aligned with the upper outer edges of the adjacent support elements, the lower core surface is aligned with the lower outer edges of the adjacent support elements, the upper and lower core surfaces are sized and configured to deform in response to rotation of the support elements.

6. The structural transition system of claim 4 wherein the upper and lower lifting member surfaces taper to a lifting member trailing edge disposed therebetween, the upper and lower control device surfaces taper to a control device trailing edge disposed therebetween, the upper and lower outer edges of each support element taper to a support element tip, the support element tips are distributed between the lifting member trailing edge and the control device trailing edge.

7. The structural transition system of claim 1 wherein the lifting member comprises a vertical tail and the control device comprises a rudder.

8. The structural transition system of claim 1 wherein the elongate members are rods.

9. The structural transition system of claim 8 wherein the rods are sized and configured to move in a twisting motion with respect to each other in response to deflection of the control device.

10. The structural transition system of claim 1 wherein the torque transfer member further comprises a flexible back plate sized and configured to slidably receive the elongate elements therewithin, the support elements are attached to the back plate.

11. The structural transition system of claim 10 further comprising at least one flexible core section interposed between and attached to the at least two support elements, wherein the core section is sized and configured to deform in response to rotation of the adjacent support elements.

12. The structural transition system of claim 1 wherein the elongate members are in slidable communication with the control device.

13. The structural transition system of claim 1 wherein the elongate members are in slidable communication with the lifting member.

14. The structural transition system of claim 1 wherein the elongate members are in slidable communication with the support elements.

15. The structural transition system of claim 1 further comprising at least one flexible core section interposed between the at least two support elements, the core section is sized and configured to deform in response to rotation of the adjacent support elements.

16. The structural transition system of claim 15 wherein each core section is wedge shaped.

17. The structural transition system of claim 15 wherein the lifting member has a lifting member trailing edge, the control device has a control device trailing edge, each core section has a core section trailing edge alignable with the lifting member trailing edge and the control device trailing edge.

18. The structural transition system of claim 1 wherein the support elements are generally planar.

19. The structural transition system of claim 1 wherein the support elements are generally triangular shaped.

20. The structural transition system of claim 1 wherein the support elements are formed of a fiberglass material.

21. The structural transition system of claim 1 further comprising a flexible outer skin attached to the lifting member and the control device, the outer skin is in mechanical communication with the support elements and deforms in response to rotation of thereof.

22. The structural transition system of claim 1 wherein the lifting member has a lifting member trailing edge, the control device has a control device trailing edge which is alignable with the lifting member trailing edge, the support elements each have a support element tip, the support element tips are distributed between the lifting member trailing edge and the control device trailing edge.

23. The structural transition system of claim 1 wherein the torque transfer element is sized and configured to deform in a twisting motion.

24. The structural transition system of claim 1 wherein the torque transfer element further comprises a flexible back plate, and wherein the support elements are attached to the back plate.

25. The structural transition system of claim 1 wherein the lifting member comprises a wing and the control device comprises a flap.

26. An aerodynamic lifting member comprising:
an indenture formed therewith and defined by a first shoulder portion;
a control device attached to the lifting member, the control device having a first end, the control device being disposed within the indenture with the first end disposed adjacent the first shoulder portion, the control device being sized and configured to rotate about a control device axis of rotation for deflecting the control device relative to the lifting member;
a torque transfer element disposable between and in mechanical communication with the first shoulder portion and the first end, the torque transfer element having a length thereof and being sized and configured to torsionally deform along the length in response to deflection of the control device; and
at least two of support elements distributed between the first shoulder portion and the first end, each of the support elements being in mechanical communication with the torque transfer element, the support elements being sized and configured to incrementally rotate generally about the control device axis of rotation in response to deformation of the torque transfer element.

27. A structural transition system for use between an aerodynamic lifting member and an aerodynamic control device attached thereto, the aerodynamic lifting member having an indenture formed therein, the indenture being defined by opposing first and second shoulder portions, the control device having opposing first and second ends, the control device being disposed within the indenture with the first end disposed adjacent the first shoulder portion and the second end disposed adjacent the second shoulder portion, the control device being sized and configured to rotate about a control device axis of rotation for deflecting the control device relative to the lifting member, the structural transition system comprising:
a first torque transfer element formed as a first elongate member disposable between and in mechanical communication with the first shoulder portion of the lifting member and the first end of the control device, the first torque transfer element being sized and configured to deform in response to deformation of the control device;
a first set of support elements distributed between the first shoulder portion and the first end, the first set of support elements being in mechanical communication with the first torque transfer element, the first set of support elements being sized and configured to incrementally rotate generally about the control device axis of rotation in response to deformation of the first torque transfer element;
a second torque transfer element formed as a second elongate member disposable between and in mechanical communication with the second shoulder portion of the lifting member and the second end of the control device, the second torque transfer element being sized and configured to deform in response to deflection of the control device; and
a second set of support elements distributed between the second shoulder portion and the second end, the second set of support elements being in mechanical communication with the second torque transfer element, the second set of support elements being sized and configured to incrementally rotate generally about the control device axis of rotation in response to deformation of the second torque transfer element.

28. An aerodynamic lifting member comprising:
an indenture formed therewith and defined by a first shoulder portion;
a control device attached to the lifting member, the control device having a first end, the control device being disposed within the indenture with the first end disposed adjacent the first shoulder portion, the control device being sized and configured to rotate about a control device axis of rotation for deflecting the control device relative to the lifting member;
a torque transfer element, formed as at least two elongate members, disposable between and in mechanical communication with the first shoulder portion and the first end, the torque transfer element being sized and configured to deform in response to deflection of the control device; and
at least two of support elements distributed between the first shoulder portion and the first end, each of the support elements being in mechanical communication with the torque transfer element, the support elements being sized and configured to incrementally rotate generally about the control device axis of rotation in response to deformation of the torque transfer element.

29. A structural transition system for use between an aerodynamic lifting member and an aerodynamic control device attached thereto, the aerodynamic lifting member having an indenture formed therein, the indenture being defined by a first shoulder portion, the control device having a first end, the control device being disposed within the indenture with the first end disposed adjacent the first shoulder portion, the control device being sized and configured to rotate about a control device axis of rotation for deflecting the control device relative to the lifting member, the structural transition system comprising:
a torque transfer element disposable between and in mechanical communication with the first shoulder portion of the lifting member and the first end of the control device, the torque transfer element being sized and configured to deform in response to deflection of the control device; and at least two of support elements distributed between the first shoulder portion and the first end, each of the support elements being in mechanical communication with the torque transfer element, the support elements being sized and configured to incrementally rotate generally about the control device axis of rotation in response to deformation of the torque transfer element;

wherein the torque transfer element comprises a flexible back plate and wherein the support elements are attached to the back plate.

30. The structural transition system of claim 29 wherein the lifting member and the control device define an aerodynamic surface contour which deforms in response to deflection of the control device, the support elements each have an outer edge which further defines the surface contour, the outer edges are sized and configured to transition the aerodynamic surface contour between the lifting member and the control device adjacent first shoulder portion of the indenture.

31. The structural transition system of claim 30 further comprising a flexible outer skin attached to the lifting member and the control device, the outer skin is in mechanical communication with the outer edges of the support elements and deforms in response to rotation of the support elements.

32. The structural transition system of claim 30 wherein the lifting member has upper and lower lifting member surfaces, the control device has upper and lower control device surfaces, the upper and lower lifting member surfaces and the upper and lower control device surfaces define the aerodynamic surface contour, the support elements each has upper and lower outer edges which further define the surface contour, the upper outer edges are sized and configured to transition the aerodynamic surface contour between the upper lifting member surface and the upper control device surface, the lower outer edges are sized and configured to transition the aerodynamic surface contour between the lower lifting member surface and the lower control device surface.

33. The structural transition system of claim 32 further comprising at least one flexible core section interposed between the at least two support elements, the core section has upper and lower core surfaces, the upper core surface is aligned with the upper outer edges of the adjacent support elements, the lower core surface is aligned with the lower outer edges of the adjacent support elements, the upper and lower core surfaces are sized and configured to deform in response to rotation of the support elements.

34. The structural transition system of claim 32 wherein the upper and lower lifting member surfaces taper to a lifting member trailing edge disposed therebetween, the upper and lower control device surfaces taper to a control device trailing edge disposed therebetween, the upper and lower outer edges of each support element taper to a support element tip, the support element tips are distributed between the lifting member trailing edge and the control device trailing edge.

35. The structural transition system of claim 29 wherein the torque transfer element further comprises at least two elongate members.

36. The structural transition system of claim 35 wherein the elongate members are rods.

37. The structural transition system of claim 36 wherein the rods are sized and configured to move in a twisting motion with respect to each other in response to deflection of the control device.

38. The structural transition system of claim 35 wherein the flexible back plate is sized and configured to slidably receive the elongate rods therewithin, and wherein the support elements are attached to the back plate.

39. The structural transition system of claim 38 further comprising at least one flexible core section interposed between and attached to the at least two support elements, the core section is sized and configured to deform in response to rotation of the adjacent support elements.

40. The structural transition system of claim 35 wherein the elongate members are in slidable communication with the control device.

41. The structural transition system of claim 35 wherein the elongate members are in slidable communication with the lifting member.

42. The structural transition system of claim 35 wherein the elongate members are in slidable communication with the support elements.

43. The structural transition system of claim 35 further comprising at least one flexible core section interposed between the at least two support elements, the core section is sized and configured to deform in response to rotation of the adjacent support elements.

44. The structural transition system of claim 43 wherein each core section is wedge shaped.

45. The structural transition system of claim 43 wherein the lifting member has a lifting member trailing edge, the control device has a control device trailing edge, each core section has a core section trailing edge alignable with the lifting member trailing edge and the control device trailing edge.

46. The structural transition system of claim 29 wherein the support elements are generally planar.

47. The structural transition system of claim 29 wherein the support elements are generally triangular shaped.

48. The structural transition system of claim 29 wherein the support elements are formed of a fiberglass material.

49. The structural transition system of claim 29 further comprising a flexible outer skin attached to the lifting member and the control device, the outer skin is in mechanical communication with the support elements and deforms in response to rotation of thereof.

50. The structural transition system of claim 29 wherein the lifting member has a lifting member trailing edge, the control device has a control device trailing edge which is alignable with the lifting member trailing edge, the support elements each have a support element tip, the support element tips are distributed between the lifting member trailing edge and the control device trailing edge.

51. The structural transition system of claim 29 wherein the torque transfer element is sized and configured to deform in a twisting motion.

52. The structural transition system of claim 29 wherein the lifting member comprises a wing and the control device comprises a flap.

53. The structural transition system of claim 29 wherein the lifting member comprises a vertical tail and the control device comprises a rudder.

54. A structural transition system for use between an aerodynamic lifting member and an aerodynamic control device attached thereto, the aerodynamic lifting member having an indenture formed therein, the indenture being defined by opposing first and second shoulder portions, the control device having opposing first and second ends, the control device being disposed within the indenture with the first end disposed adjacent the first shoulder portion and the second end disposed adjacent the second shoulder portion, the control device being sized and configured to rotate about a control device axis of rotation for deflecting the control device relative to the lifting member, the structural transition system comprising:

a first torque transfer element disposable between and in mechanical communication with the first shoulder portion of the lifting member and the first end of the control device, the first torque transfer element being sized and configured to deform in response to deformation of the control device;

a first set of support elements distributed between the first shoulder portion and the first end, the first set of support elements being in mechanical communication with the first torque transfer element, the first set of support elements being sized and configured to incrementally rotate generally about the control device axis of rotation in response to deformation of the first torque transfer element;

a second torque transfer element disposable between and in mechanical communication with the second shoulder portion of the lifting member and the second end of the control device, the second torque transfer element being sized and configured to deform in response to deflection of the control device; and a second set of support elements distributed between the second shoulder portion and the second end, the second set of support elements being in mechanical communication with the second torque transfer element, the second set of support elements being sized and configured to incrementally rotate generally about the control device axis of rotation in response to deformation of the second torque transfer element;

wherein the torque transfer element comprises a flexible back plate, and wherein the support elements are attached to the back plate.

55. An aerodynamic lifting member comprising:

an indenture formed therewith and defined by a first shoulder portion;

a control device attached to the lifting member, the control device having a first end, the control device being disposed within the indenture with the first end disposed adjacent the first shoulder portion, the control device being sized and configured to rotate about a control device axis of rotation for deflecting the control device relative to the lifting member;

a torque transfer element disposable between and in mechanical communication with the first shoulder portion and the first end, the torque transfer element being sized and configured to deform in response to deflection of the control device; and at least two of support elements distributed between the first shoulder portion and the first end, each of the support elements being in mechanical communication with the torque transfer element, the support elements being sized and configured to incrementally rotate generally about the control device axis of rotation in response to deformation of the torque transfer element;

wherein the torque transfer element comprises a flexible back plate, and wherein the support elements are attached to the back plate.

56. A structural transition system for use between an aerodynamic lifting member and an aerodynamic control device attached thereto, the aerodynamic lifting member having an indenture formed therein, the indenture being defined by a first shoulder portion, the control device having a first end, the control device being disposed within the indenture with the first end disposed adjacent the first shoulder portion, the control device being sized and configured to rotate about a control device axis of rotation for deflecting the control device relative to the lifting member, the structural transition system comprising:

a torque transfer element disposable between and in mechanical communication with the first shoulder portion of the lifting member and the first end of the control device, the torque transfer element having a length thereof and being sized and configured to torsionally deform along the length in response to deflection of the control device; and at least two of support elements distributed between the first shoulder portion and the first end, each of the support elements being in mechanical communication with the torque transfer element, the support elements being sized and configured to incrementally rotate generally about the control device axis of rotation in response to deformation of the torque transfer element.

57. A structural transition system for use between an aerodynamic lifting member and an aerodynamic control device attached thereto, the aerodynamic lifting member having an indenture formed therein, the indenture being defined by opposing first and second shoulder portions, the control device having opposing first and second ends, the control device being disposed within the indenture with the first end disposed adjacent the first shoulder portion and the second end disposed adjacent the second shoulder portion, the control device being sized and configured to rotate about a control device axis of rotation for deflecting the control device relative to the lifting member, the structural transition system comprising:

a first torque transfer element between and in mechanical communication with the first shoulder portion of the lifting member and the first end of the control device, the first torque transfer element having a length thereof and being sized and configured to torsionally deform along the length in response to deformation of the control device;

a first set of support elements distributed between the first shoulder portion and the first end, the first set of support elements being in mechanical communication with the first torque transfer element, the first set of support elements being sized and configured to incrementally rotate generally about the control device axis of rotation in response to deformation of the first torque transfer element;

a second torque transfer element disposable between and in mechanical communication with the second shoulder portion of the lifting member and the second end of the control device, the second torque transfer element having a length thereof and being sized and configured to torsionally deform along the length in response to deflection of the control device; and a second set of support elements distributed between the second shoulder portion and the second end, the second set of support elements being in mechanical communication with the second torque transfer element, the second set of support elements being sized and configured to incrementally rotate generally about the control device axis of rotation in response to deformation of the second torque transfer element.

* * * * *